(12) United States Patent
Boecklein et al.

(10) Patent No.: US 12,472,488 B2
(45) Date of Patent: Nov. 18, 2025

(54) CATALYST SYSTEM FOR PRODUCING MALEIC ANHYDRIDE BY MEANS OF THE CATALYTIC OXIDATION OF N-BUTANE

(71) Applicant: CLARIANT INTERNATIONAL LTD, Muttenz (CH)

(72) Inventors: Sebastian Boecklein, Bruckmuehl (DE); Gerhard Mestl, Bruckmuehl (DE); Anna Adler, Bruckmuehl (DE); Martin Kutscherauer, Hoerlkofen (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 798 days.

(21) Appl. No.: 17/766,283

(22) PCT Filed: Oct. 9, 2020

(86) PCT No.: PCT/EP2020/078408
§ 371 (c)(1),
(2) Date: Apr. 4, 2022

(87) PCT Pub. No.: WO2021/074029
PCT Pub. Date: Apr. 22, 2021

(65) Prior Publication Data
US 2022/0266233 A1  Aug. 25, 2022

(30) Foreign Application Priority Data
Oct. 15, 2019 (DE) .................... 10 2019 127 790.6

(51) Int. Cl.
*B01J 35/00* (2006.01)
*B01J 35/31* (2024.01)
*B01J 35/55* (2024.01)
*B01J 35/61* (2024.01)
*C07D 307/60* (2006.01)

(52) U.S. Cl.
CPC ............... *B01J 35/19* (2024.01); *B01J 35/31* (2024.01); *B01J 35/55* (2024.01); *B01J 35/612* (2024.01); *C07D 307/60* (2013.01)

(58) Field of Classification Search
CPC ....................................... B01J 35/19
See application file for complete search history.

(56) References Cited

U.S. PATENT DOCUMENTS

| 4,342,699 | A | 8/1982 | Palmer |
| 6,005,121 | A | 12/1999 | Ebner |
| 7,566,428 | B2 | 7/2009 | Warner |
| 8,263,789 | B2 | 9/2012 | Wilmer |
| 9,409,160 | B2 | 8/2016 | Reitzmann |
| 9,931,618 | B2 | 4/2018 | Cotter |

FOREIGN PATENT DOCUMENTS

| CN | 101568378 | | 10/2009 |
| CN | 103269798 | A | 8/2013 |
| CN | 105163844 | | 12/2015 |
| HU | 201886 | | 1/1991 |
| HU | T64880 | | 3/1994 |
| WO | 2014131435 | | 9/2014 |

*Primary Examiner* — Golam M Shameem

(57) ABSTRACT

The invention relates to a catalyst system for producing maleic anhydride by means of the catalytic oxidation of n-butane, comprising at least one reactor tube, which has two catalyst layers consisting of different catalyst particles, characterized in that the geometric surface area per catalyst particle is greater in the catalyst layer that is first in the gas flow direction than in the second catalyst layer. The invention further relates to a process for producing maleic anhydride by means of the catalytic oxidation of n-butane, wherein a mixture of oxygen and n-butane is fed through the catalyst system according to the invention and the at least one reactor tube is at elevated temperature.

8 Claims, 6 Drawing Sheets

Figure 1:
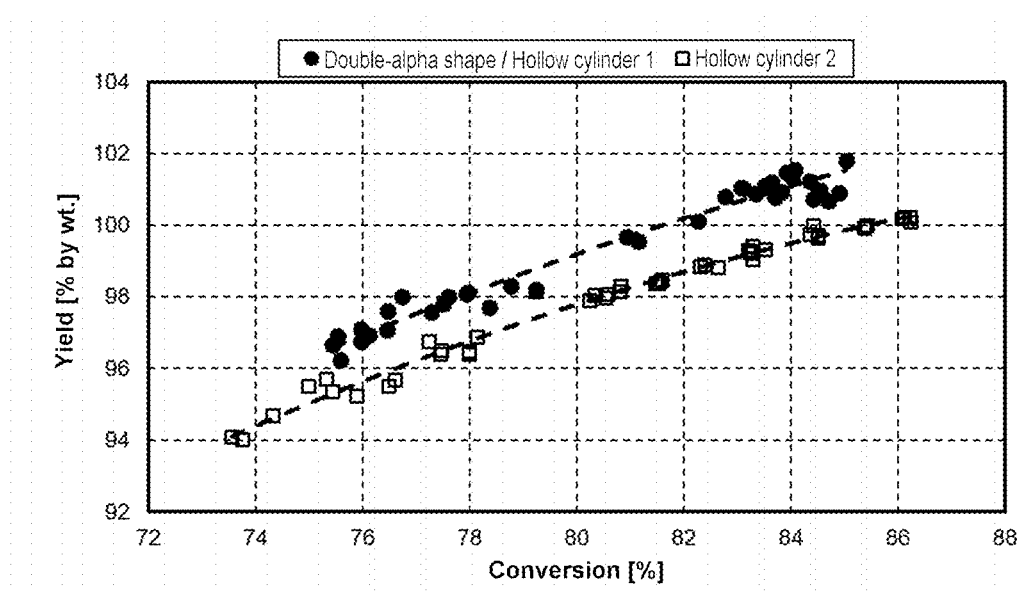

CATALYST SYSTEM FOR PRODUCING MALEIC ANHYDRIDE BY MEANS OF THE CATALYTIC OXIDATION OF N-BUTANE

The invention relates to a catalyst system for producing maleic anhydride by catalytic oxidation of n-butane, comprising at least one reactor tube comprising two catalyst layers consisting of different catalyst particles, characterized in that in the first catalyst layer in the gas flow direction the geometric surface area per catalyst particle is greater than in the second catalyst layer.

The invention further relates to a process for producing maleic anhydride by catalytic oxidation of n-butane, wherein a mixture of oxygen and n-butane is passed through the bi-layered catalyst system according to the invention and the at least one reactor tube is at elevated temperature.

Maleic anhydride is a chemical intermediate of great economic importance. It is employed for example in the production of alkyd and polyester resins, alone or in combination with other acids. Furthermore, it also constitutes a versatile intermediate for chemical synthesis, for example for synthesis of γ-butyrolactone, tetrahydrofuran and 1,4-butanediol, which are in turn employed on their part as solvents or may be further processed to afford polymers, for example polytetrahydrofuran or polyvinyl pyrrolidone.

Industrial preparation of maleic anhydride (MA) from n-butane is carried out via a selective gas phase oxidation in cooled tube bundle reactors, wherein catalyst particles are filled into the reactor tubes as VPO catalysts and therein form a catalyst bed. Since a large amount of heat is liberated in the course of the reaction (n-butane to MA: −1260 kJ/mol, n-butane to $CO_2$: 2877 kJ/mol), the reaction is generally carried out in tube bundle reactors having internal tube diameters of typically 21 mm in order to be able to dissipate this heat via the tube wall into the cooling medium composed of a salt melt.

EP 2643086 A1 discloses catalyst shaped bodies for catalytic reaction of n-butane to maleic anhydride in fixed bed reactors, wherein the catalyst shaped body is in the form of a cylinder having a base surface, a cylinder surface, a cylinder axis and at least one uninterrupted opening running parallel to the cylinder axis, and the base surface of the cylinder comprises at least four lobes, wherein a geometric base body surrounding the catalyst shaped body is a prism having a prism base surface having a length and a width, wherein the length is greater than the width.

U.S. Pat. No. 6,005,121 discloses an improved process for producing maleic anhydride by catalytic oxidation of a nonaromatic hydrocarbon having at least four carbon atoms in a straight chain, wherein an oxygen- and hydrocarbon-containing gas is passed through a catalyst fixed bed in a tubular reactor. The activity of the catalyst bed is graded such that the reactor may be operated at an initial (input gas) hydrocarbon concentration of more than 1.5% by volume, an integrated average temperature difference between the gas and the cooling liquid of at least about 15° C. over the part of the bed in which the gas temperature exceeds the cooling fluid temperature and a productivity of at least about 5.0 lbs of maleic anhydride per hour without the temperature difference between the gas and the cooling liquid exceeding 80° C. at any point in the catalyst bed over the course of the reaction. It is preferable when the catalyst activity and the gas permeability of the bed are varied in the direction of the gas flow so that both the catalyst activity and the pressure drop per unit distance are lower in a critical region where the combination of temperature and hydrocarbon concentration could otherwise have the result that the reaction proceeds at an excessive rate compared to a region of the low temperature and low hydrocarbon concentration.

It is therefore the object to provide a catalyst system, especially for a tube bundle reactor, for catalytic oxidation of n-butane to afford maleic anhydride which allows thermally stable operation and a high MA yield.

The object is achieved by a catalyst system in which two types of differently shaped catalyst particles are filled into the reactor tube in series; this catalyst system comprises a reactor tube having two catalyst layers each consisting of different catalyst particles, characterized in that in the first catalyst layer in the gas flow direction the geometric surface area per catalyst particle is greater than in the second catalyst layer.

The object is also achieved by a process for producing maleic anhydride by catalytic oxidation of n-butane, wherein a mixture of oxygen and n-butane is passed through the catalyst system according to the invention and the one reactor tube is at elevated temperature.

The part of the reactor tube filled with catalyst particles typically has a length of 3 to 8 m, preferably 4 to 6 m. However, the catalyst system according to the invention is particularly suitable for short reactor tubes having a filled portion having a length between 4 and 5 m or for example 4.5 m. The catalytic oxidation of n-butane to afford maleic anhydride is carried out in this section of the reactor tube filled with catalyst particles and the temperature in this region must therefore be controlled, i.e. thermostatted. The reactant gas which must contain n-butane and oxygen contains for example a mixture of between 0.2% to 10% by volume of n-butane and 5% to 50% by volume of oxygen. The reactant gas typically consists of a mixture of 0.5% to 3% by volume of n-butane, 10% to 30% by volume of oxygen, balance inert gas such as nitrogen and 1% to 4% by volume of water. It is particularly preferable when the reactant gas contains air and the relevant amount of n-butane and optionally water is added. Small amounts of 0.5 to 5 ppm or 1 to 3 ppm, based on the gas volume, of organic phosphate esters such as trimethyl phosphate or triethyl phosphate may preferably be present in the reactant gas to compensate the phosphate loss of the catalyst. The reactant gas is passed into the reactor tube (typically from below) and in the portion of the reactor tube filled with catalyst particles contacts said particles at elevated temperature, thus oxidizing n-butane to afford maleic anhydride.

It is preferable when a multiplicity of reactor tubes which may be thermostatted individually or in common are present. Since the selective oxidation of n-butane to afford maleic anhydride is an exothermic reaction excess heat must be dissipated, but it must simultaneously be ensured that the reactor tubes have the necessary reaction temperature. The thermostatting is preferably carried out via a salt bath (for example a eutectic mixture of potassium nitrate and sodium nitrite in a ratio of about 1:1) in which a multiplicity of reactor tubes are submerged. During the reaction the salt bath typically has a temperature between 380° C. and 430° C. During the reaction a temperature profile in the axial direction is established inside the reactor tube and a region of maximum temperature ("hotspot") forms in the first third of the reactor tube. The maximum temperature in the reactor tube is typically 430° C. to 460° C. and a maximum temperature between 440° C. and 450° C. is preferred according to the invention.

The catalyst particles preferably contain a vanadyl pyrophosphate phase (VPO phase) and may be supported or else consist entirely of the VPO phase. The VPO phase may comprise the customary dopants, including especially molybdenum and/or alkali metals as described for example in DE 10 2014 004786 A1.

According to the invention the reactor tube comprises or consists of two catalyst layers comprising catalyst particles which differ in their geometry. These two catalyst particle dumped beds are traversed by the reactant gas inside the reactor tube, wherein one opening of the tube serves as the gas inlet while the opposite opening serves as the gas outlet. According to the invention the catalyst layer closer to the gas inlet is the first catalyst layer in the gas flow direction while the subsequent catalyst layer in the gas flow direction is the second catalyst layer. It is preferable when the two catalyst layers are immediately consecutive, i.e. contact one another. The length of a catalyst layer is the axial section of the reactor tube occupied by the respective catalyst particles. The length of the first catalyst layer in the gas flow direction is not less than the length of the second catalyst layer in the gas flow direction. It is preferable when the ratio of the length of the first catalyst layer to the second catalyst layer is in the range from 1:1 to 5:1, particularly preferably from 2:1 to 4:1.

According to the invention the geometric surface area per catalyst particle is greater in the first catalyst layer in the gas flow direction than in the second catalyst layer. It is preferable when the catalyst particles of the first catalyst layer have a surface area of more than 1.9 cm$^2$, preferably more than 2.2 cm$^2$. The catalyst particles of the second catalyst layer have a surface area of less than 1.8 cm$^2$, preferably less than 1.5 cm$^2$. It is preferable when the internal diameter of the reactor tube is not less than 20 mm to 23 mm, preferably not less than 21 mm. The reactor tubes typically have a wall thickness of 1 to 2 mm and the external diameter of the reactor tubes is therefore correspondingly greater than the internal diameter.

It is preferable for the embodiment according to the invention when the poured density of the catalyst particles of the first catalyst layer in the reactor tube is less than 0.8 g/cm$^3$, in particular less than 0.7 g/cm$^3$. By contrast, the poured density of the catalyst particles of the second catalyst layer in the reactor tube is preferably more than 0.7 g/cm$^3$, in particular more than 0.8 g/cm$^3$.

Preferred catalyst particles for use in the catalyst system according to the invention are those described in EP 2643086 A1. These preferred catalyst particles are especially characterized in that each individual catalyst particle is in the form of a cylinder having an outer base surface [1], a cylinder surface [2], a cylinder axis and at least one uninterrupted opening [3] running parallel to the cylinder axis, and the outer base surface [1] of the cylinder contains at least four lobes [4a, 4b, 4c, 4d], wherein a geometric base body enclosing the catalyst particles is a prism having a prism base surface having a length and a width, wherein the length is greater than the width, wherein the lobes [4a, 4b, 4c, 4d] are enclosed by prism corners of the prism base surface.

According to the invention the surface area per catalyst particle $O_P$ is not to be understood as meaning the specific BET surface area of the catalyst material but rather the external geometric surface area of a catalyst particle, i.e. the surface area that would result if the catalyst particle were a solid, non-porous body. The external geometric surface area of the catalyst particle results from its geometric dimensions alone. By contrast, the specific BET surface area is the internal surface area of the porous powder per gram.

An axial section of the reactor tube is to be understood as meaning a section delimited by two notional lines running perpendicular to the longitudinal direction of the reactor tube, so that the resulting notional cut surfaces are circular. The axial section has a length L and an internal diameter D of the reactor therefore results in the following dimensions: Surface area of the reactor inner wall ($O_R$) $O_R=\pi*D*L$, volume of this reactor section ($V_R$) $V_R=\pi/4*D^2*L$, cross sectional area of the inside of the reactor tube ($O_R$) $O_R=D^2*\pi/4$.

According to the invention:

$$O_{P1} > O_{P2}$$

$OP_1-OP_2$ is preferably >1 cm$^2$, particularly preferably >0.8 cm$^2$, most preferably >0.5 cm$^2$.

$O_{P1}$, is preferably more than 1.9 cm$^2$, particularly preferably more than 2.0 cm$^2$ most preferably more than 2.2 cm$^2$ and $O_{P2}$ is less than 1.8 cm$^2$, particularly preferably less than 1.7 cm$^2$ most preferably less than 1.5 cm$^2$.

In one embodiment $O_{P1}$ is between 2.1 cm$^2$ and 2.8 cm$^2$, preferably between 2.3 cm$^2$ and 2.5 cm$^2$, and $O_{P2}$ is between 0.9 cm$^2$ and 1.8 cm$^2$, preferably between 1.1 cm$^2$ and 1.3 cm$^2$.

FIG. 1: Catalytic test results for a catalyst system according to the invention compared to a customary catalyst system (double-alpha shape/hollow cylinder 1 and hollow cylinder 2, GHSV=1900 h$^{-1}$, 1.8% by volume n-butane).

Figure 2:
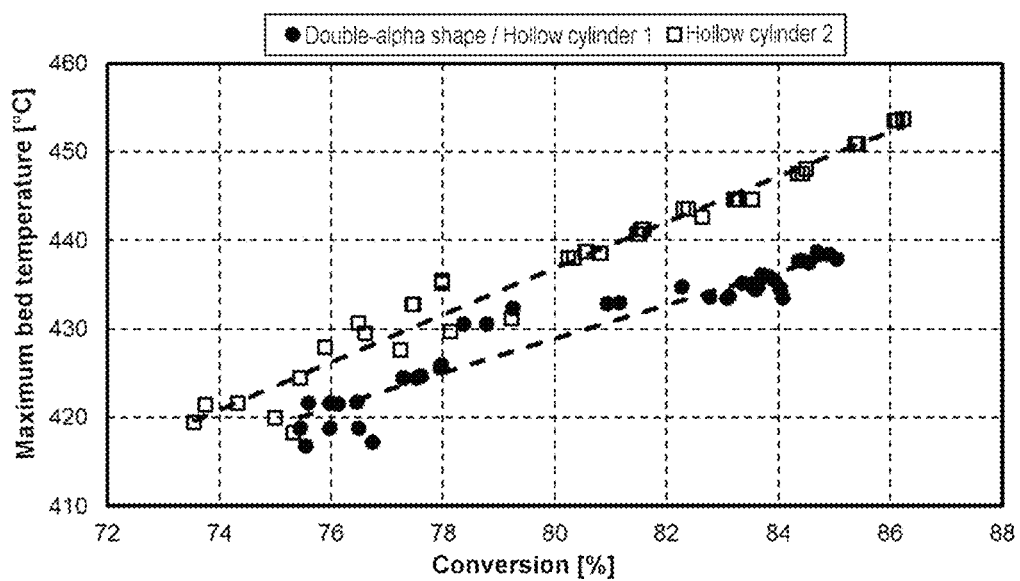

FIG. 2: Maximum bed temperature when using the catalyst system according to the invention compared to a customary catalyst system (double-alpha shape/hollow cylinder 1 and hollow cylinder 2, GHSV=1900 h$^{-1}$, 1.8% by volume n-butane).

Figure 3:
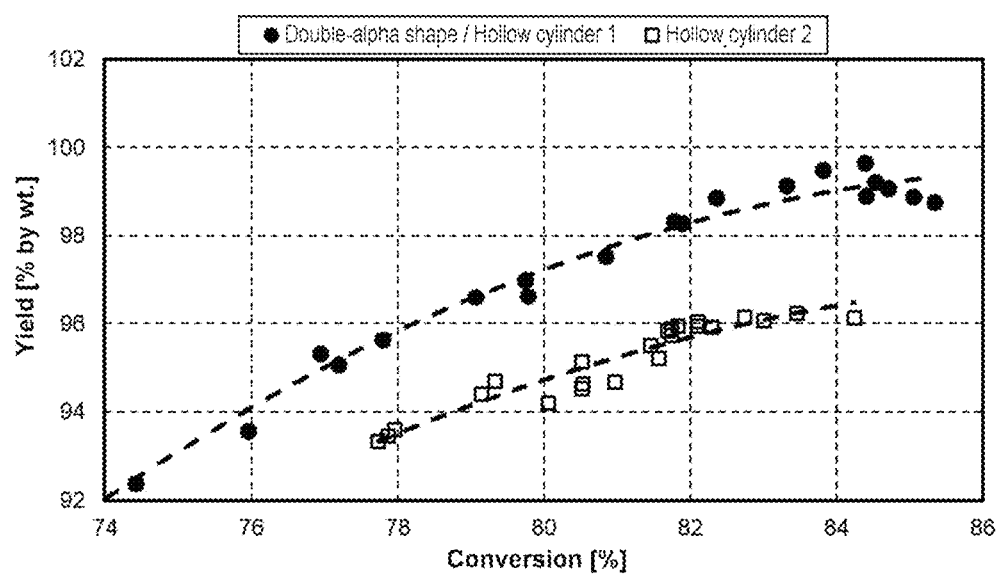

FIG. 3: Catalytic test results for a catalyst system according to the invention compared to a customary catalyst system (double-alpha shape/hollow cylinder 1, hollow cylinder 2, GHSV=2100 h$^{-1}$, 1.9% by volume n-butane).

Figure 4:
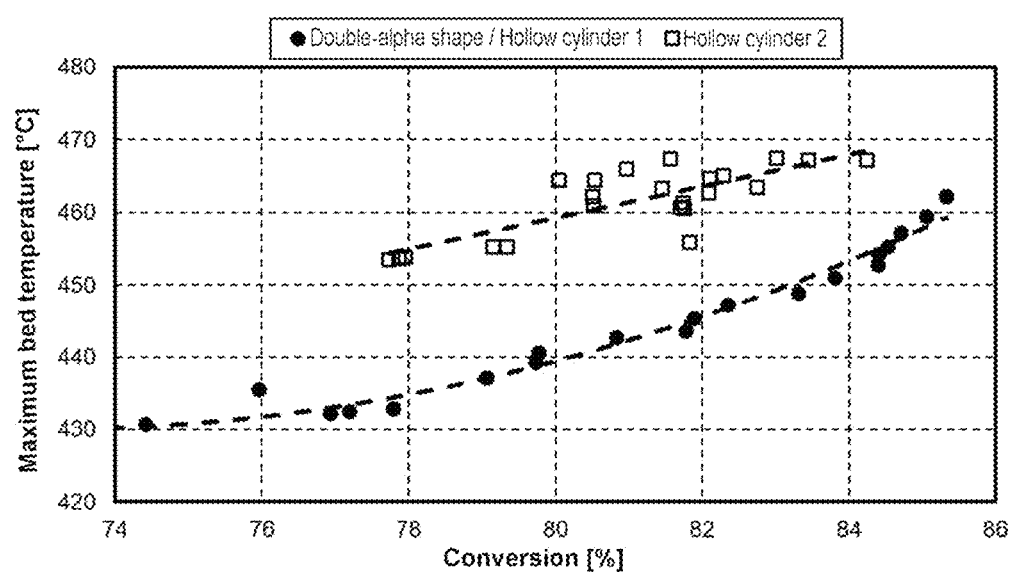

FIG. 4: Maximum bed temperature when using the catalyst system according to the invention compared to a customary catalyst system (double-alpha shape/hollow cylinder 1, hollow cylinder 2, GHSV=2100 h$^{-1}$, 1.9% by volume n-butane).

Figure 5:
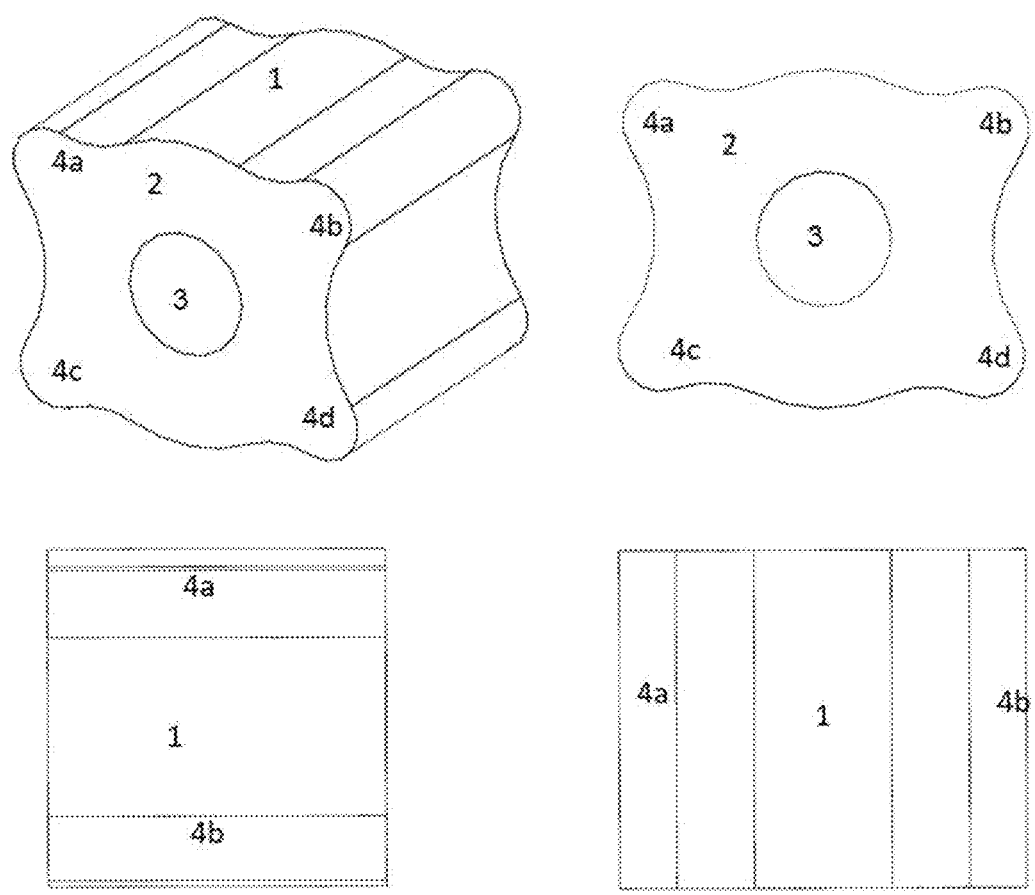

FIG. 5: Preferred catalyst particle for the first catalyst layer in the gas flow direction from four angles, the "double-alpha shape".

Figure 6:
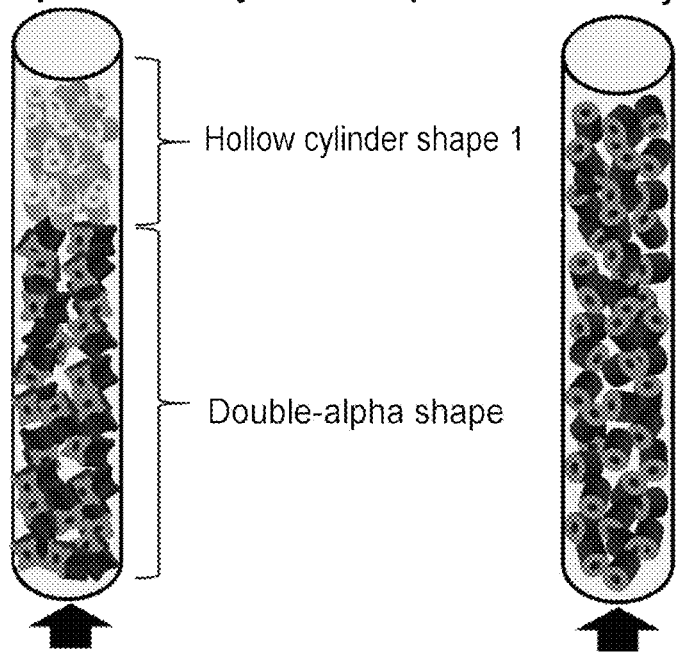

FIG. 6: Schematic representation of the catalyst system according to the invention compared to conventional catalyst system.

EXAMPLES

Production of reaction mixture and reduction: 1069.5 g of isobutanol and 156.0 g of benzyl alcohol are initially added. 150 g of $V_2O_5$ are added with stirring. The $V_2O_5$ addition is followed by addition of 2.52 g of ammonium dimolybdate. Subsequently, 232.50 g of phosphoric acid (100%, anhydrous) are added to the suspension and the mixture is heated under reflux under $N_2$ for 10 h.

Filtration: After cooling the intermediate suspension, said suspension is transferred from the four-necked flask into a filter funnel and the liquid is removed by vacuum. The damp filtercake is pressed dry overnight at 14 to 18 bar in a press.

Drying: The pressed filtercake is transferred into the evaporator flask of a rotary evaporator. The filtercake is dried at 110° C. overnight under water jet vacuum. The powder dried in this way is placed in a furnace in a suitable calcining pot and calcined at temperatures of 200° C. to 300°

C. in an $N_2$ atmosphere for 9 hours. This affords the dried intermediate ($VMo_{0.0088}OHPO_4 \times 0.5H_2O$).

Tableting: Prior to compacting/tableting the calcined pulverulent intermediate is admixed with 5% by weight of graphite and commixed to homogeneity using a drum hoop mixer. This powder is compacted into plates with a roller compactor at a compaction pressure of 190 bar, a gap width of 0.60 mm and a roller speed of 7 rpm and granulated through a 1 mm sieve.

The granulate is pressed to afford the desired tablet shape and lateral compressive strength using a rotary tablet press.

A double-alpha shape was pressed with a height of 5.6 mm, a length of 6.7 mm, a width of 5.8 mm and an internal hole diameter of 2.1 mm. These catalyst particles have a geometric surface area of 2.37 $cm^2$, a volume of 0.154 $cm^3$ and a mass of 0.24 g. Filling into a 21 mm reactor results in a poured density of 0.60 $g/cm^3$ to 0.62 $g/cm^3$.

For comparison, catalyst particles were pressed in the customary cylinder shape 1, hollow cylinder shape 1, with a height of 4.7 mm, an external diameter of 4.7 mm and a central axial opening having a diameter of 1.3 mm. These bodies have a geometric surface area of 1.2 $cm^2$, a volume of 0.075 $cm^3$ and a mass of 0.12 g. Filling into a 21 mm reactor results in a poured density of 0.85 to 0.89 $g/cm^3$.

Hollow cylinder 2 has a height of 5.6 mm, an external diameter of 5.5 mm and a central axial opening having a diameter of 2.3 mm. These bodies have a surface area of 1.77 $cm^2$, a volume of 0.111 $cm^3$ and a mass of 0.18 g. Filling into a 21 mm reactor results in a poured density of 0.72 to 0.76 $g/cm^3$.

Activation to afford the pyrophosphate: The activation to form vanadium pyrophosphate is performed under controlled conditions in a retort installed in a programmable furnace. The calcined tablets are uniformly filled into the retort and the latter is tightly sealed. The catalyst is subsequently activated in a moist air/nitrogen mixture (50% atmospheric humidity) initially at over 300° C. for 5 h and subsequently at over 400° C. for 9 h.

Pilot Test, Reaction Conditions

The catalytic test reactions were performed under comparable conditions in a tube reactor having a 21 mm internal diameter at a catalyst bed length of 4.5 m. The catalysts were tested under two conditions, a low-load scenario and a high-load scenario. In the first scenario a space velocity (GHSV expressed in $h^{-1}$) of 1900 $h^{-1}$ was used and the reactant stream consisted of 1.8% by volume of n-butane, diluted in air, 2.3% to 2.7% by volume of water and about 2 ppm of trimethyl phosphate. The high-load scenario used a space velocity of 2100 $h^{-1}$ at a reaction gas composition of 1.9% by volume of n-butane, diluted in air, 3% by volume of water and about 3 ppm of trimethyl phosphate. The yield of maleic anhydride is expressed in percent by weight (% by weight) based on the weight of the employed n-butane.

FIGS. 1 to 4 show the results of the catalytic test reaction and the temperature distributions when using the catalyst system according to the invention using double-alpha shaped catalyst particles in the first catalyst layer and catalyst particles of hollow cylinder shape 1 in the second catalyst layer compared to the conventional catalyst system where exclusively catalyst particles of hollow cylinder shape 2 are present in the reactor tube. FIGS. 1 and 2 show the low-load scenario while FIGS. 3 and 4 show the high-load scenario.

It is apparent that use of the catalyst system according to the invention results in yields of maleic anhydride that are about 2% by weight higher at identical conversions under the low-load conditions. In other words the catalyst system according to the invention shows higher selectivity for the desired reaction product maleic anhydride at identical conversion. A similar effect is established under high-load conditions, the catalyst system according to the invention then bringing about an increase in the MA yield of more than 4% by weight.

As is apparent in FIGS. 2 and 4 the reactor system according to the invention reduces the hotspot temperature on the reactor outlet side by broadening the profile and partially forming a second hotspot. This results in an elevated MA selectivity.

The invention claimed is:

1. A Catalyst system for producing maleic anhydride by catalytic oxidation of n-butane, comprising at least one reactor tube comprising two catalyst layers having different catalyst particles, wherein the first catalyst layer in the gas flow direction the geometric surface area per catalyst particle is greater than in the second catalyst layer.

2. The Catalyst system according to claim 1, wherein the geometric surface area per catalyst particle in the first catalyst layer is at least 0.5 cm2, greater than in the second catalyst layer.

3. The Catalyst system according to claim 1, wherein the geometric surface area per catalyst particle is more than 1.9 cm2, in the first catalyst layer and less than 1.8 cm2, in the second catalyst layer.

4. The Catalyst system according to claim 1, wherein the poured density of the catalyst particles in the first catalyst layer in the gas flow direction is less than 0.8 g/cm3.

5. The Catalyst system according to claim 1, wherein the catalyst particles in the first catalyst layer in the gas flow direction are in the form of a cylinder having an outer base surface [1], a cylinder surface [2], a cylinder axis and at least one uninterrupted opening [3] running parallel to the cylinder axis, and the outer base surface [1] of the cylinder contains at least four lobes [4a, 4b, 4c, 4d], wherein a geometric base body enclosing the catalyst particles is a prism having a prism base surface having a length and a width, wherein the length is greater than the width, wherein the lobes [4a, 4b, 4c, 4d] are enclosed by prism corners of the prism base surface.

6. The Catalyst system according to claim 1, wherein the at least one reactor tube may be thermostatted in a salt bath.

7. The Catalyst system according to claim 1, wherein a tube bundle reactor having a multiplicity of reactor tubes that may be thermostatted via a salt bath is concerned.

8. The Catalyst system according to claim 1, wherein the filled portion of the reactor tube is 4 m to 5 m long.

* * * * *